METHOD OF AND CIRCUIT ARRANGEMENT FOR SECURING TELEPRINTER MESSAGES
Filed Oct. 4, 1960

United States Patent Office 3,267,213

Patented August 16, 1966

3,267,213
METHOD OF AND CIRCUIT ARRANGEMENT FOR SECURING TELEPRINTER MESSAGES

Erich Berger, Krailling, near Munich, Germany, assignor to Siemens & Halske Aktiengesellschaft, Berlin and Munich, Germany, a corporation of Germany Filed Oct. 4, 1960, Ser. No. 60,487
Claims priority, application Germany, Oct. 16, 1959, S 65,452
6 Claims. (Cl. 178—69)

Figure 1:
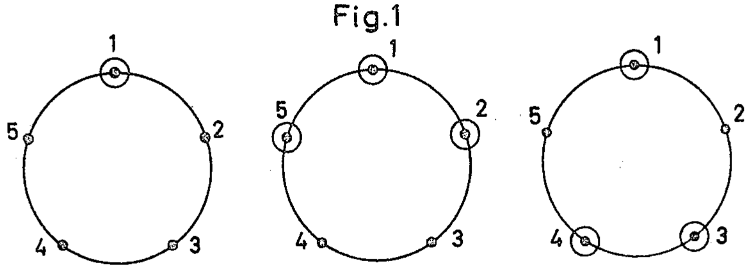

This invention is concerned with a method of and a circuit arrangement for securing teleprinter messages.

In telegraphy and particularly in teleprinter operation, the so-called teleprinter code No. 2 is being used for the transmission of teleprinter symbols, wherein five (5) telegraph elements are allocated to each individual symbol. It is thus possible to form a total of thirty two (32) symbols with the aid of five elements for each, thirty one (31) symbols being thereby used for the transmission of teleprinter texts. Accordingly, nearly to each of these thirty two (32) code combinations is assigned a symbol (letter, numeral or punctuation mark). The falsification of even a single element therefore results in an error which cannot be recognized in the receiver.

While a wrong letter appearing in a received message can be relatively easily corrected according to the context, such correction is entirely impossible in the case of numerals. It is however of great interest to ascertain whether or not an erroneous symbol has been received so as to avoid evaluation of the erroneous message.

It has already been proposed, for error recognition, to allocate to each individual symbol of the teleprinter alphabet seven (7) elements, whereby only those of the possible number of combinations ($2^7=128$) are utilized for message transmission, which show a certain ratio of elements of one polarity to elements of another polarity. Absence of this ratio in a received code combination is evidence of falsification of the received symbol. In such a case, an indicating device may be actuated or callback may be effected, that is, transmission of a signal to the sending station, requesting retransmission of the falsified symbol passage. The seven (7) element code makes it possible to ascertain at any rate disturbances of first order (falsification of elements of one polarity to another polarity). However, this code fails altogether in the case of disturbances of second order (transposition errors), since the falsification by transposition of two elements of different polarity produces another symbol which satisfies the given code requirements.

Other methods of securing teleprinter messages against disturbances have also become known. One of these methods proposes to repeat each individual teleprinter symbol identically or in mirrored representation, depending upon the number of elements of a certain polarity within the first symbol, thereby enabling flawless recognition even of errors of higher order as well as correction of errors of first order. This method provides moreover the advantage that no particular measures are required at the teleprinter apparatus for producing the symbols and that no local code converters need be provided in the course of a connection. A drawback of this method resides in the relatively low communication flow since each symbol consisting of five (5) elements requires transmission of a control symbol likewise having five (5) elements. This means that the flow of communication over the transmission channel drops to one-half (½), and to $\frac{7}{12}$, respectively, when considering the transmission of start and stop signals. The transmission, after each symbol, of an individual control symbol will be more advantageous than this method, in case the disturbances are caused by noise occurring along blank message portions.

A telegraph system has also become known wherein a control symbol is transmitted which is derived from each two teleprinter symbols by simple addition of the respective elements of the two message symbols. The drawback of this transmission method is that even falsifications of at least two elements, occurring at mutually corresponding places, are not satisfactorily recognized in each case, occasioning instead false corrections. In such case, both symbols are erroneously evaluated; any possibility for correction is excluded.

The present invention is based upon recognition of the fact that the securing of messages such as it can be obtained by the use of the above indicated method with ten (10) elements, requires as such fewer control symbols but makes it nevertheless possible to produce control combinations which can be transmitted by the known and customary devices without alteration thereof. The method according to the invention proposes to allocate to each two teleprinter symbols, which are in customary manner transmitted in a teleprinter code consisting of five (5) elements, a control symbol of likewise five (5) elements, which is respectively common thereto, and interlinking the individual elements of the control symbol by an appropriate allocation locking with at least two and preferably with three elements of each of the two message symbols which are to be secured.

The use of a control symbol constructed in this manner increases the signal flow, as compared with the known method, by only fifty percent (50%) or, upon considering the start and stop elements of 2 times 7=14, to seventeen (17) elements, that is, by only twenty-three percent (23%). However, as calculations have shown, the same securing is obtained that would result from allocating to each individual symbol a control symbol having five (5) elements, which must merely be identical with or mirror-like with respect to the message symbol. Only then will be obtained a gain (incident to noise at blank or vacant message portions) as compared with securing by a single control element. Moreover, the advantage is retained that no code converters are required in the sender and receiver and that the parts which are present along the transmission channel for a five-element code can be used without alteration thereof.

Figure 2:
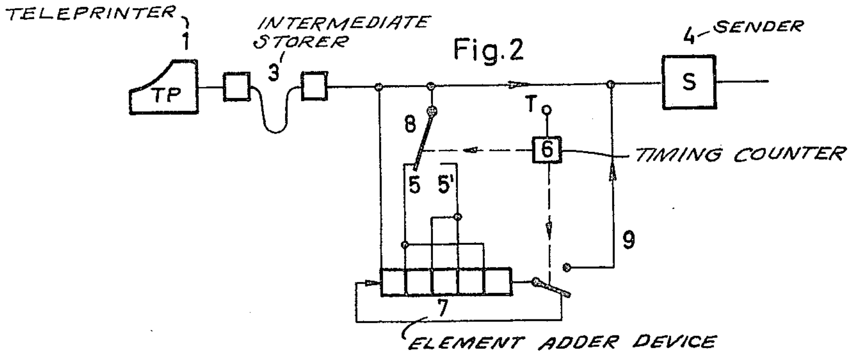
Figure 3:
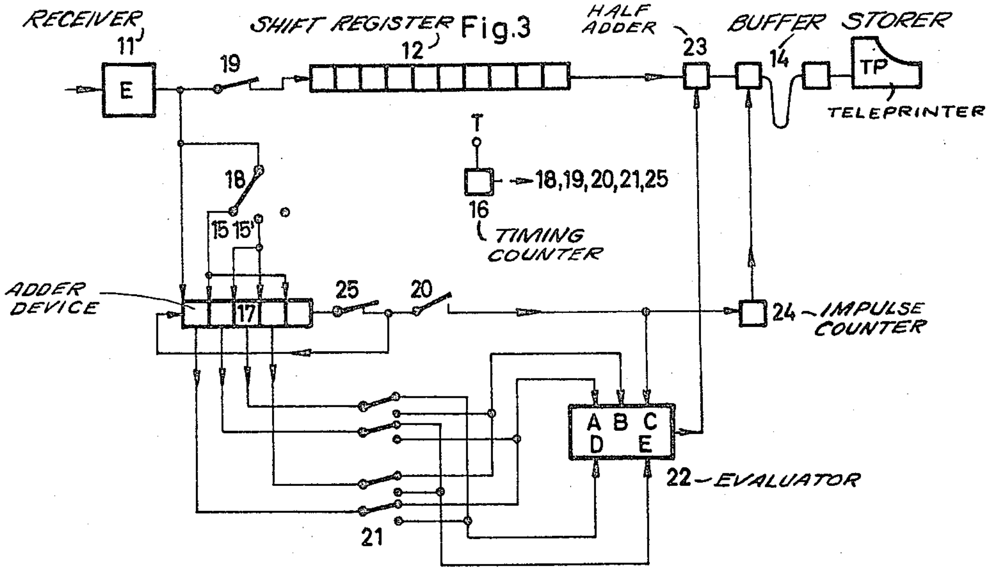

The various objects and features of the invention will appear from the description thereof which is rendered below with reference to the accompanying drawing, in which FIG. 1 explains the allocation locking employed;

FIG. 2 illustrates in schematic block diagram manner the sender arrangement; and FIG. 3 represents in similar manner the receiver arrangement.

The locking to be employed in accordance with the invention is such that all single as well as double errors are recognized with certainty. The locking consists in allocating, within the control symbol, to each individual element of a given polarity of a symbol, three particular elements of the same or of the other polarity, and constructing the control symbol by addition of the polarity values which are ascertained by calculation. This will now be explained with reference to an embodiment.

It shall be assumed that three elements lying side by side are, with cyclic permutation of the control symbol, allocated to a spacing element within the first symbol and three to a spacing element of the second symbol, each by a spacing between two of the three spacing elements, in effect forming an intermediate symbol. The corresponding allocation locking is schematically represented in FIG. 1. Upon the left hand circle appear the numerals 1 to 5 which are assumed to be assigned to the five elements of a teleprinter symbol. The central circle shows the allocation locking or formation of the equivalent intermediate symbol for the elements of the first symbol and the right hand circle shows the allocation locking or formation of the equivalent intermediate symbol for the elements of the second symbol.

Accordingly, if the first element in the first symbol is, for example, a spacing element, and if the first symbol is to be locked or keyed in the symbol pair, this element and the two respectively neighboring elements, that is, the first, the second and the fifth element, shall be, in accordance with the allocation locking, a spacing current element in the control symbol, and, if the second symbol is to be locked in the symbol pair, this element and the elements respectively disposed spaced therefrom shall be reproduced as spacing current elements. For the second symbol, this would be the first, the third and the fourth element. To aid in the explanations, the respective numerals have been provided with auxiliary identifying circles. Thus the allocation locking or so-called intermediate symbol is dependent upon the presence of a spacing element and consequently indirectly takes into consideration a marking element.

In accordance with this rule, the allocation locking therefore reads as follows, letters S and M respectively indicating space and mark elements and the left-hand column indicating the location of the space element involved, while the right-hand column indicates the locking allocation or so-called intermediate symbol therefor:

For the first symbol:

| | |
|---|---|
| SMMMM | SSMMS |
| MSMMM | SSSMM |
| MMSMM | MSSSM |
| MMMSM | MMSSS |
| MMMMS | SMMSS |

and for the second symbol:

| | |
|---|---|
| SMMMM | SMSSM |
| MSMMM | MSMSS |
| MMSMM | SMSMS |
| MMMSM | SSMSM |
| MMMMS | MSSMS |

It will be noted that while the above tabulation presents an allocation locking or intermediate symbol for each successive element of the first symbol to be transmitted, such an allocation will be made only where the particular element (first, second, third, fourth or fifth) is a space current element, so that the total number of so-called intermediate symbols would correspond to the total number of space current elements appearing in the transmission symbol involved. The control symbol to be transmitted is then derived from the respective intermediate symbols.

For example, upon transmitting the letters A and B, and assuming that the teleprinter symbols are to be mutually secured by a code combination according to the invention, by means of five (5) elements, utilizing this locking, the control code combination will be constructed as follows:

According to the international teleprinter alphabet No. 2, the letters A and B consist respectively of the combinations A ------------------------------------ SSMMM
B ------------------------------------ SMMSS The teleprinter symbol A therefore has two space current elements respectively at the first and second place and the symbol B has three space current elements respectively at the first, fourth and fifth place. The control symbol will therefore be composed of the polarity addition of intermediate symbols representing the first and second elements of the symbol A, and the first, fourth and fifth elements of the second symbol, in accordance with the above tabulation. The control symbol is then composed as follows:

| | |
|---|---|
| SSMMS | SSMSM |
| SSSMM | MSSMS |
| SMSSM | MMSMM |

The control symbol which is to be transmitted with the two symbols which are to be secured is thus made up of intermediate symbols representing the first two elements of the first symbol to be transmitted and those representing the first, fourth and fifth elements of the second symbol to be transmitted, and upon polarity addition of such intermediate symbols therefore reads

MMSMM

It can be demonstrated that single and double disturbances within message symbols and/or within the control symbol are recognized with certainty upon deriving, in the receiver, from the two message symbols, the control symbol and upon comparing the control symbol thus derived with the received control symbol.

Accordingly, in the present method, a total of fifteen (15) elements are used for the transmission of two teleprinter symbols, that is, as compared with the previously ten-element method, five (5) elements less or, as compared with a method operating with a seven (7) element code, one element for two symbols and, accordingly one-half (½) element more per symbol. (In the start-stop operation, the ratio is even 2 times 9 to 17, that is, one-half (½) element less.)

The circuit arrangements required in the sender and the receiver for carrying out the method, consist in the simplest case merely of a simple counter, one (two) shift register and one evaluation (comparison) device for evaluating the correctors formed in the receiver. The principles of such circuit arrangements will now be explained with reference to the drawing, FIG. 2 showing a sender arrangement and FIG. 3 a receiver arrangement for practicing the method according to the invention. Both figures are in schematic block diagram manner since the individual parts can be constructed mechanically as well as electronically in accordance with known techniques.

In FIG. 2, numeral 1 indicates a teleprinter machine (TP), for example of the type illustrated in Patent No. 2,640,872, from which are transmitted customary teleprinter symbols in the form of series of five-element combinations. Numeral 3 indicates an intermediate storer which is made in the form of a punched tape storer, for example of the type illustrated in Patent No. 2,259,517. The teleprinter symbols are to be transmitted by a sender 4(S) over a line or a wireless transmitter.

In accordance with the invention, there is provided a coding network 5, 5' which is connected with a timing counter 6, for example of the type illustrated in Patent No. 2,868,455, such network being responsive to receipt of spacing current and marking current elements effective to produce the locking current elements corresponding thereto and to conduct such elements to the element adder device 7, which for example could be of the type illustrated in Patent No. 2,758,788, and in proceedings P of the IRE 1955, pages 291–298. This adding device is constructed as a shift register with intermediate half adders. The first symbol within a symbol pair (timing signals 1–5) is conducted to the coding network 5 over switch 8 while the second symbol (timing signals 6–10) is conducted to the coding network 5'. The actuation of the switch 8 is effected after the timing signal 5.

The control symbol is completely formed in the element adder 7 as soon as the ten (10) symbol elements are transmitted and can then be given off to the sender 4 (timing signals 11–15) as an addition to the two teleprinter symbols which are transmitted without changes. The adder device will be vacant as soon as the control symbol is transmitted, and the next two symbols can then be processed.

In case a letter is keyed in the teleprinter machine without being followed by the keying of another letter, a timing member will become effective after a given waiting interval to supplement the one letter by a vacancy symbol (for example, if letters had already been transmitted, combination 32 or switch-over B$u$ and otherwise Z$i$), to form a pair which is being transmitted.

FIG. 3 shows a receiver apparatus comprising a receiver 11 which transmits the received symbols to a teleprinter machine TP over a shift register 12, for example of the type illustrated in Patent No. 2,700,502. A buffer storer 14, for example of the type illustrated in Patent No. 2,259,517, is provided between the shift register 12 and the teleprinter machine, such buffer storer being effective to supply the teleprinter machine continuously with teleprinter symbols to be reproduced despite the fact that the storage delivery operation takes place intermittently since a control symbol is transmitted always between a pair of message symbols. The control symbol corresponding to the received elements of the two teleprinter symbols (timing signals 1–10) is constructed in a manner as at the sender side. For this purpose, there are provided two coding networks 15, 15', timing counter 16, element adder device 17 and a switch 18. These parts are constructed in accordance with the parts 5, 5', 6, 7, 8 at the sender side, with the sole exception that the switch 18 has a third (vacant) position which it assumes responsive to being switched over a second time, by the timer counter 16, after the tenth (10th) timing signal.

The five control elements (timing signals 11 to 15) which now follow are likewise conducted to the adder device 17, the coding networks being thereby disconnected (switch 18 being in its vacant position) and the shift register 12 standing still because switch 19 is opened after the tenth (10th) timing signal. In case of faultless transmission, the adder device should contain only zeroes (0) after the fifteenth (15th) timing impulse. Owing to transmission errors, another sequence of numerals can appear, the so-called "corrector," such corrector, when showing a numeral One (1) marking a single error in the (transmitted) control elements, a single error in the information elements when containing three numerals One, and an incorrectible error when containing two, four or five numerals One.

The switch 20 is closed after the fifteenth (15th) timing signal and the corrector is conducted to the evaluator 22 over five lines, with each timing signal in another cyclic permutation. The shift register 12 operates now again and conducts the information elements to the storer 14 (timing signals 16 to 25), the corrections being meanwhile added in the half adder 23. The evaluator 22, which for example may employ circuits of the type illustrated in Patents Nos. 2,879,411 and No. 2,910,594, produces a correction impulse only responsive to receipt of an impulse at each of the respective inputs A, B, C with no impulse arriving at D and E.

The impulse counter 24 simultaneously counts the impulses of the corrector. The storer 14 is released after the twentieth (20th) timing signal only if 0, 1 or 3 impulses had been counted; if such is not the case, two smudge symbols will be printed.

The switch 21 is placed into alternate position after the twentieth (20th) timing signal, and the elements of the second teleprinter symbol are corrected in corresponding manner. (As a matter of fact, at the most one correction can be effected in both symbols.)

The shift register 12 is vacant after the twenty-fifth (25th) timing signal and the adder device 17 is restored, for example, by opening the switch 25 and permitting the register to idle into normal position (timing signals 26 to 30).

Since the processing of a pair of symbols requires in the sender 15 timing signals, but in the receiver 25–30 timing signals, the latter must contain two detectors (timer, shift register, adder device, evaluator), which operate alternately. The second timer is required since the timing of the respectively next successive symbol group is determined by the start signal which arrives in any given phase position.

The invention has been explained with reference to two devices which are of particularly simple construction and adapted to function satisfactorily in series operation. It is to be understood, however, that these devices, that is, the sender and the receiver, can be modified. It is especially feasible to respectively receive the individual symbols in series operation or to convert them after the receipt thereof into series representation, and to form the control symbols immediately thereafter. However, the advantage will be obtained in any case that the polarity of an individual element within a teleprinter symbol affects the condition of several elements within a control symbol, so that the falsification of individual elements must result in symbols which do not any more satisfy the code requirement.

Changes may be made within the scope and spirit of the appended claims which define what is believed to be new and desired to have protected by Letters Patent.

I claim:

1. In a system for directly transmitting teleprinter messages in accordance with the five-element code, apparatus for securing said messages by allocating to each two five-element message symbols a control symbol likewise having five elements as determined by an intermediate control system, comprising coding means for forming an intermediate symbol for each individual element, dependent upon the nature of such element, which likewise has five elements, at least two of which have the same polarity as the element to be secured, thereby assuring allocation of the same polarity in corresponding manner for all elements of the message symbols, the elements of said intermediate symbols being arranged in predetermined cyclic permutation dependent upon whether the message symbol involved is the first or second of two symbols to be secured, and means connected to said coding means for receiving the elements of said intermediate symbols in permutated form and adding corresponding elements of the intermediate control symbols for both message symbols, thereby forming said control symbol for transmission after transmission of the two message symbols which are to be secured.

2. Apparatus according to claim 1, wherein said apparatus includes means cooperable therewith operatively effective in the presence of only one symbol to be transmitted for automatically allocating a vacancy symbol for the formation of said control symbol.

3. Apparatus according to claim 1, wherein the coding means for one of said message symbols is so constructed that in the resulting intermediate control symbols the control symbol element corresponding to that to be secured and the two respectively adjacent elements are utilized in a cyclic polarity permutation and the coding means for the other message symbol is so constructed that in the resulting intermediate control symbols the control symbol element corresponding to that to be secured and the elements spaced therefrom are utilized in a cyclic polarity permutation.

4. In the teleprinter art, a sender for directly transmitting teleprinter messages in accordance with the five-element code, a receiver for receiving said teleprinter messages, apparatus in said sender for securing said messages by allocating to each two five-element message symbols a control symbol likewise having five elements, said apparatus comprising coding means for forming an intermediate control symbol for each individual element, dependent upon the nature of such element, which likewise has five elements, at least two of which have the same polarity as the element to be secured, thereby assuring allocation of the same polarity in corresponding manner for all elements of the message symbols, the elements of said intermediate symbols being arranged in predetermined cyclic permutation dependent upon whether the message symbol involved is the first or second of said two symbols to be secured, and means connected to said coding means for receiving the elements of said intermediate symbols in permutated form and adding corresponding elements of the intermediate control symbols for both message symbols, thereby forming said control symbol for transmission to said receiver after transmission of the two message symbols which are to be secured; said receiver having corresponding coding means and means connected thereto for forming upon receipt of a pair of message symbols a corresponding control symbol, and means for comparing the control symbol thus formed at the receiver with the transmitted control symbol received thereat so as to ascertain proper receipt of the message symbols.

5. A transmission system for telegraph symbols, wherein each symbol is formed by an identical plurality of elements, whereby each element can assume one or two possible polarity conditions, and wherein control symbols are formed at the transmitter, from the elements of the telegraph symbols, for the recognition of errors at the receiver, one control symbol being transmitted for each two telegraph symbols formed and compared at the receiver with a control symbol formed thereat from received telegraph symbols comprising storage means in the form of registers disposed respectively at the transmitter and at the receiver, means dependent upon nature of the transmitted and received element, for storing a potential in said storage means in a plurality of storage positions, such potential corresponding to the potential of the element involved, and means cooperable with said registers for additively superposing the potentials at the corresponding storage positions to produce a control symbol with as many elements as one of the message symbols.

6. In a system for directly transmitting teleprinter messages in accordance with the five-element code, apparatus for securing said messages by allocating to each two five-element message symbols a control symbol likewise having five elements as determined by an intermediate control system, comprising coding means for forming an intermediate symbol for each individual element of the first message symbol, dependent upon the nature of such element, which is to be cyclically permutated for the respective elements of such message symbol, coding means for forming a different intermediate symbol for each individual element of the second message symbol, dependent upon the nature of such element, which is to be cyclically permutated for the individual elements of the second message symbol, each intermediate symbol having at least two of the elements thereof of the same polarity as the element to be secured, thereby assuring allocation of the same polarity in corresponding manner for all elements to be secured, adding means for adding the elements of the intermediate control symbols, and means connecting said coding and adding means for feeding the individual elements of each intermediate control symbol, produced in said coding means, to said adding means in cyclically permutated form, said adding means being operable to form said control symbol for transmission after transmission of the two message symbols which are to be secured.

References Cited by the Examiner

UNITED STATES PATENTS

| | | | |
|---|---|---|---|
| 1,972,326 | 9/1934 | Angel | 178—23.1 |
| 2,512,038 | 6/1950 | Potts | 178—23.1 |
| 2,552,629 | 5/1951 | Hamming et al. | 340—146.1 |
| 2,575,268 | 11/1951 | Griffith | 178—23.1 |
| 2,653,996 | 9/1953 | Wright | 178—23.1 |
| 2,849,532 | 8/1958 | Hennig | 178—23.1 |
| 2,854,653 | 9/1958 | Lubkin | 178—23.1 |
| 2,880,273 | 3/1959 | Bauer | 178—23.1 |
| 2,993,956 | 7/1961 | Steeneck | 178—23.1 |

OTHER REFERENCES

Publication: "An Error-Correcting Encoder . . . ." Green and San Soucie, Proc. of the IRE, October 1958, pages 1741–1744.

NEIL C. READ, *Primary Examiner.*

NEWTON LOVEWELL, ROBERT H. ROSE, STEPHEN W. CAPELLI, *Examiners.*

A. J. DUNN, T. A. ROBINSON, *Assistant Examiners.*